(12) United States Patent
Kjaer-Lohse et al.

(10) Patent No.: US 10,214,142 B2
(45) Date of Patent: Feb. 26, 2019

(54) ROAD VEHICLE TURN SIGNAL ASSIST SYSTEM AND METHOD

(71) Applicant: VOLVO CAR CORPORATION, Gothenburg (SE)

(72) Inventors: Henrik Kjaer-Lohse, Espergaerde (DK); Jesper Nolhage, Kobenhavn V (DK); Claus Allan Christensen, Kobenhavn S (DK)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 15/790,500

(22) Filed: Oct. 23, 2017

(65) Prior Publication Data
US 2018/0118100 A1 May 3, 2018

(30) Foreign Application Priority Data
Oct. 28, 2016 (EP) .................................... 16196253

(51) Int. Cl.
| | |
|---|---|
| *B60Q 1/48* | (2006.01) |
| *B60Q 1/34* | (2006.01) |
| *B62D 15/02* | (2006.01) |
| *G01C 21/36* | (2006.01) |
| *G06K 9/00* | (2006.01) |

(52) U.S. Cl.
CPC ............. *B60Q 1/488* (2013.01); *B60Q 1/346* (2013.01); *B62D 15/027* (2013.01); *G01C 21/3685* (2013.01); *G06K 9/00812* (2013.01); *B62D 15/021* (2013.01); *B62D 15/0285* (2013.01)

(58) Field of Classification Search
CPC ...... B60Q 1/346; B60Q 1/488; B62D 15/027; G01C 21/3685; G06K 9/00812
USPC ......................................................... 340/465
See application file for complete search history.

(56) References Cited

U.S. PATENT DOCUMENTS

| | | | |
|---|---|---|---|
| 9,983,020 B2 * | 5/2018 | Sakuma | ............ G01C 21/3605 |
| 2011/0128140 A1 | 6/2011 | Pampus et al. | |
| 2014/0214260 A1 | 7/2014 | Eckert et al. | |

(Continued)

FOREIGN PATENT DOCUMENTS

| | | |
|---|---|---|
| DE | 10355807 | 7/2004 |
| DE | 102013206208 | 10/2014 |

OTHER PUBLICATIONS

Extended European Search Report for European Application No. EP 16196253.5, Completed by the European Patent Office, dated Apr. 12, 2017, 6 Pages.

*Primary Examiner* — Omar Casillashernandez
(74) *Attorney, Agent, or Firm* — Brooks Kushman P.C.

(57) ABSTRACT

A road vehicle turn signal assist system and method are described for a road vehicle having turn indicators, a positioning system having access to map data, one or more sensors for monitoring the road vehicle surroundings, and one or more gears for selectively travelling forward or in reverse. Current positioning information and map data for the current position is used to determine if parking of the road vehicle is in progress when a reverse gear is selected. If it is determined that parking of the road vehicle is in progress and the one or more sensors for monitoring the road vehicle surroundings detect a moving object, a right hand side or a left hand side road vehicle turn indicator is activated, if not already manually activated, to indicate the ongoing parking operation.

20 Claims, 2 Drawing Sheets

(56) References Cited

U.S. PATENT DOCUMENTS

2016/0114726 A1\* 4/2016 Nagata .................. B60Q 9/007
  340/435
2017/0129537 A1\* 5/2017 Kim .................. B62D 15/0285
2018/0075744 A1\* 3/2018 Seo ........................ G08G 1/146

\* cited by examiner

ROAD VEHICLE TURN SIGNAL ASSIST SYSTEM AND METHOD

CROSS-REFERENCE TO RELATED APPLICATIONS

This application claims foreign priority benefits under 35 U.S.C. § 119(a)-(d) to European patent application number EP 16196253.5, filed Oct. 28, 2016, which is incorporated by reference in its entirety.

TECHNICAL FIELD

The present disclosure relates to a road vehicle turn signal assist system for a road vehicle having turn indicators and comprising a positioning system having access to map data and one or more sensors for monitoring the road vehicle surroundings as well as one or more gears for selectively travelling forward or in reverse.

The disclosure further relates to a road vehicle turn signal assist method for a road vehicle having turn indicators and comprising a positioning system having access to map data and one or more sensors for monitoring the road vehicle surroundings as well as one or more gears for selectively travelling forward or in reverse.

Still further, the disclosure refers to a road vehicle comprising such a road vehicle turn signal assist system.

BACKGROUND

It is known that users of road vehicles such as cars, lorries, buses or trucks, do not always enable the turn indicator when a parking spot is identified and about to be entered. The absence of an activated turn signal increases the risk that other motor vehicle drivers, pedestrians and cyclists will not perceive or misunderstand the parking intentions of such road vehicle users. Such lack of perception or misunderstanding may cause stressful and potentially dangerous situations and potentially also accidents.

The reasons why such road vehicle users fail to activate the turns signal are diverse. For instance, they may simply forget to do so due to a hectic and stressful traffic environment, e.g. city traffic. In some instances the road vehicle user may have activated the turn signal, but then unintentionally deactivated it, e.g. due to spinning of the steering wheel and the automatic release of the turn signal indicator when the steering wheel is returned to the neutral position or due to hand movements causing unintentional contact with a turn signal activation/deactivation lever, which usually is situated in the vicinity of the steering wheel.

Activation of the turn signal may in some cases also have been intentionally ignored, e.g. due to laziness on the part of the road vehicle user or due to the road vehicle user being unable to observe any other motor vehicles, pedestrians or cyclists, and therefore assuming that no other motor vehicle drivers, pedestrians and cyclists will be affected by the lack of an activated turn indicator.

An automated method for providing an indication, with the aid of a turn signal indicator, that a vehicle is leaving a parking space is previously known from US 2011128140 A1, in which a vehicle control system detects initially whether an executed driving maneuver is a maneuver related to leaving a parking space, in which case the maneuvering out of a parking space is indicated by activating the turn signal indicator, and the turn signal indicator is kept activated until the process of maneuvering out of the parking space has been concluded. An executed driving maneuver is e.g. detected as pull-out maneuver when the distance sensors detect stationary objects in front of and/or behind the vehicle or when a first driving movement in a first direction is followed by a second driving movement in a second direction opposite the first direction, and when a steering movement takes place during at least one of these maneuvers.

Furthermore, through US 2014214260 A1 is known an assistance system that particularly uses a top view system to perform an autonomous or semi-autonomous driving maneuver, especially an assistance system that serves to perform an autonomous or semi-autonomous maneuver in order to get into or out of a parking space. In the assistance system an overall image of the surroundings of the vehicle made up of several individual images is processed. Image data are generated from the surroundings of a vehicle, such as by means of several cameras directed toward different regions of the surroundings of the vehicle. The image data is suitably processed by means of image processing devices in order to perform the driving maneuver, e.g., in such a manner that objects, such as other vehicles and obstacles, are detected from the image data, the distances to the detected objects are determined, the length and the depth of a parking space is calculated, and the necessary driving maneuver including the required steering angles are derived on the basis of this information. In addition to the camera system, further sensors, such as ultrasonic, radar, lidar, and laser sensors, may be used to detect objects and obstacles and to calculate the length and the depth of the parking space. At least one direction in which the vehicle moves when performing the autonomous or semi-autonomous driving maneuver is indicated by means of at least one light signal device, whereby passengers and other road users, in particular, people in the vicinity of the vehicle, can be informed about the direction of movement intended by the assistance system and/or about the exact movement trajectory, driving path, of the vehicle. By indicating the at least one direction of movement, it is stated that accidents can be avoided or the potential of danger to people can be reduced.

Although the above mentioned previously known methods and arrangements are useful in reducing cases of lack of activated turn signals during road vehicle parking maneuvers, there is still room for further improvement in this field.

SUMMARY

Embodiments herein aim to provide an improved road vehicle turn signal assist system for a road vehicle having turn indicators and comprising a positioning system having access to map data and one or more sensors for monitoring the road vehicle surroundings as well as one or more gears for selectively travelling forward or in reverse.

This is provided through that the turn signal assist system is arranged to use current positioning information and map data for the current position to determine if parking of the road vehicle is in progress when a reverse gear is selected, and if determined that parking of the road vehicle is in progress and the one or more sensors for monitoring the road vehicle surroundings are detecting moving objects if not already manually activated, activate the right hand side or left hand side road vehicle turn indicators to indicate the ongoing parking operation.

According to a second embodiment the turn signal assist system further, in order to determine if parking of the road vehicle is in progress, is arranged to use the current positioning information and map data for the current position to determine if there exists a parking slot at the current position, and if determined that a parking slot exists determine that parking of the road vehicle is in progress.

The provision of using the current positioning information and map data for the current position to determine if there exists a parking slot at the current position provides an efficient way of determining that parking of the road vehicle is in progress.

According to a third embodiment the road vehicle further comprises an arrangement for vehicle-to-vehicle or vehicle-to-infrastructure communication arranged to receive dynamic information relating to the availability of a free parking slot at the current position, and if determined that a free parking slot exists determine that parking of the road vehicle is in progress.

The provision of using dynamic information relating to the availability of a free parking slot at the current position provides for a further efficient way of determining that parking of the road vehicle is in progress.

According to a fourth embodiment the road vehicle further comprises a navigation system capable of providing navigational instructions for travelling to a specified destination, and if determined that the current position is within a pre-determined proximity of the specified destination determine that parking of the road vehicle is in progress.

The provision of using information if a current position is within a pre-determined proximity of a specified destination provides for a still further efficient way of determining that parking of the road vehicle is in progress.

According to a fifth embodiment the navigation system further is arranged to predict a travel destination when no destination has been specified, and if determined that the current position is within a pre-determined proximity of the predicted travel destination determine that parking of the road vehicle is in progress.

The provision of using a predicted travel destination and determining if the current position is within a pre-determined proximity of the predicted travel destination provides for a yet further efficient way of determining that parking of the road vehicle is in progress.

According to a sixth embodiment the road vehicle further comprises a driver monitoring camera arranged to determine a viewing direction of a driver of the road vehicle and that the determined viewing direction is used for selectively activating right hand side or left hand side road vehicle turn signals The provision of using a determined viewing direction of a driver of the road vehicle for selectively activating right hand side or left hand side road vehicle turn signals provides an efficient way of selecting which side road vehicle turn signals to activate.

According to a seventh embodiment the road vehicle further comprises a parking assistance system arranged to scan the road vehicle surroundings to identify available parking slots and that slot identified information from the parking assistance system is used for selectively activating right hand side or left hand side road vehicle turn signals The provision of using slot identified information from the parking assistance system for selectively activating right hand side or left hand side road vehicle turn signals provides a further efficient way of selecting which side road vehicle turn signals to activate.

According to an eight embodiment map data comprising information on available parking slots at the current position is used for selectively activating right hand side or left hand side road vehicle turn signals The provision of using information on available parking slots at the current position obtained from map data for selectively activating right hand side or left hand side road vehicle turn signals provides a still further efficient way of selecting which side road vehicle turn signals to activate.

According to a ninth embodiment the road vehicle further is arranged to access cloud data relating to parking slot availability at the current position using vehicle-to-vehicle or vehicle-to-infrastructure communication and that the cloud data relating to parking slot availability at the current position is used for selectively activating right hand side or left hand side road vehicle turn signals The provision of using information on available parking slots at the current position obtained from cloud data for selectively activating right hand side or left hand side road vehicle turn signals provides a yet further efficient way of selecting which side road vehicle turn signals to activate.

According to a tenth embodiment the road vehicle further comprises a 360° surround view system arranged to provide a driver of the road vehicle with a bird's-eye view of the road vehicle surroundings and that the turn signal assist system further is arranged to determine that parking of the road vehicle is in progress when a reverse gear is selected and the 360° surround view system is active.

The provision of determining that parking of the road vehicle is in progress when a reverse gear is selected and the 360° surround view system is active provides an efficient way of determining that parking of the road vehicle is in progress.

According to an eleventh embodiment the road vehicle further comprises a steering angle sensor arranged to provide information on a current road vehicle steering angle and the information on the current road vehicle steering angle is used for selectively activating right hand side or left hand side road vehicle turn signals The provision of using information on the current road vehicle steering angle for selectively activating right hand side or left hand side road vehicle turn signals provides a yet further efficient way of selecting which side road vehicle turn signals to activate.

According to a twelfth embodiment an improved road vehicle turn signal assist method is provided for a road vehicle having turn indicators and comprising a positioning system having access to map data and one or more sensors for monitoring the road vehicle surroundings as well as one or more gears for selectively travelling forward or in reverse This is provided through that the method comprises using current positioning information and map data for the current position to determine if parking of the road vehicle is in progress when a reverse gear is selected, and if determined that parking of the road vehicle is in progress and the one or more sensors for monitoring the road vehicle surroundings are detecting moving objects if not already manually activated, activating the right hand side or left hand side road vehicle turn indicators to indicate the ongoing parking operation.

According to a thirteenth embodiment a road vehicle is provided that comprises a road vehicle turn signal assist system as above.

The provision of a road vehicle that comprises a road vehicle turn signal assist system as above, provides for reducing cases of lack of activated turn signals during road vehicle parking maneuvers.

BRIEF DESCRIPTION OF THE DRAWINGS

In the following, embodiments herein will be described in greater detail by way of example only with reference to attached drawings, in which.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
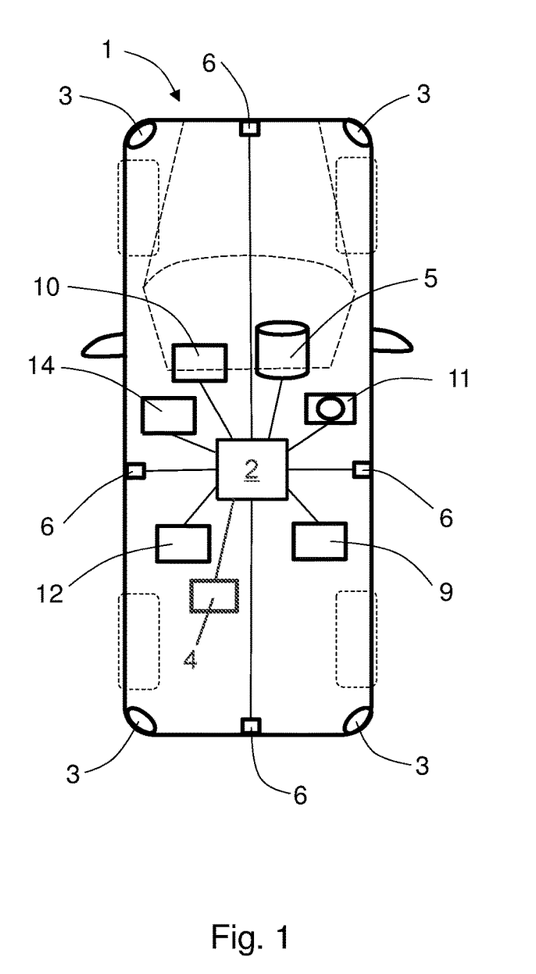
FIG. 1 is a schematic top-view illustration of a road vehicle comprising a turn signal assist system according to embodiments herein.

A road vehicle 1 comprising a road vehicle turn signal assist system 2 according to embodiments herein is schematically illustrated in FIG. 1. The road vehicle turn signal assist system 2 is provided for automatically engaging road vehicle 1 turn indicators 3 when a driver of the road vehicle 1 is about to park the road vehicle 1. The wheels of the road vehicle 1 and the bonnet and windshield of the road vehicle 1 are indicated by dashed lines in FIGS. 1 and 2 in order to enhance the understanding of the figures.

Figure 2:
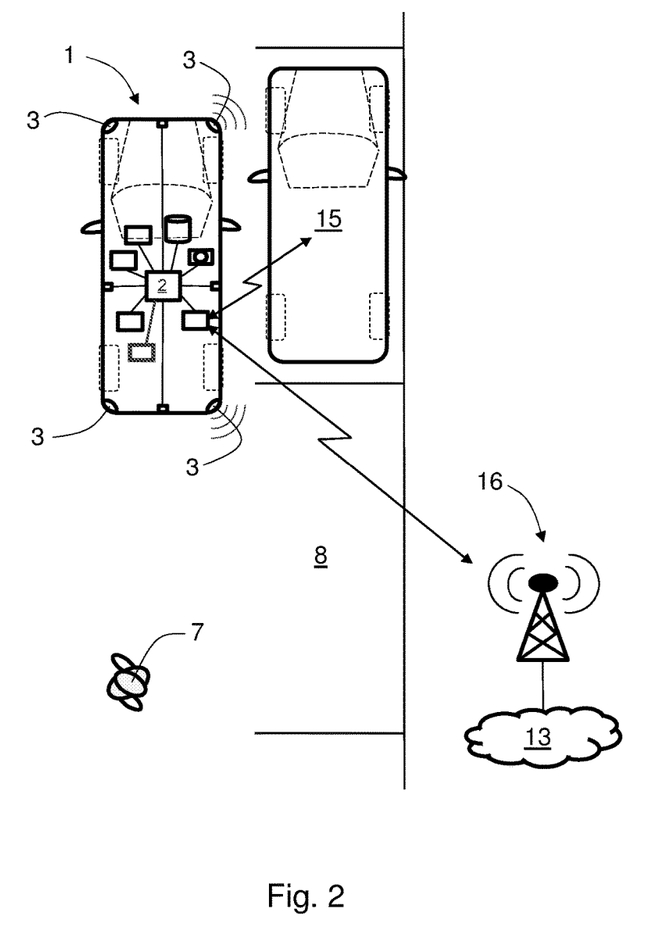
FIG. 2 is a schematic top-view illustration of a road vehicle according to FIG. 1 in a parking scenario.

The road vehicle 1 turn signal assist system 2 illustrated in FIG. 1 is based on the pre-requisite that the road vehicle 1 has turn indicators 3, here indicated as a respective turn indictor 3 being arranged at the respective four corners of the road vehicle 1, as is common. It is further envisaged that the road vehicle 1 comprises a positioning system 4, such as a satellite based navigation system of GPS or Glonass type, which has access to map data 5, either stored locally within the road vehicle 1, as illustrated at reference numeral 5 in FIG. 1, or made accessible to the positioning system 4 of the road vehicle via some kind of wireless communications method, e.g. as illustrated in FIG. 2, alternatives of which communication methods should be well known to a person skilled in the art. It is furthermore assumed that the road vehicle 1 has one or more sensors 6 for monitoring the road vehicle 1 surroundings, examples of such sensors, short- and long-range, are not limited to but include: camera based sensors; radar based sensors; lidar based sensors and ultrasonic based sensors as well as any combination of such sensors and sensor fusion thereof. The sensors 6 may also be part of other road vehicle 1 systems, such as e.g. a blind spot information system or a 360° surround view system of the road vehicle 1.

As will be described further in the following, for the road vehicle 1 turn signal assist system 2 illustrated in FIG. 1 it is envisaged that the road vehicle 1 for some embodiments further comprises an arrangement 9 for vehicle-to-vehicle (V2V) or vehicle-to-infrastructure (V2X) communication, a navigation system 10, a driver monitoring camera 11, a parking assistance system 12 and a 360° surround view system 14.

Thus, the road vehicle 1 turn signal assist system 2 is designed for a road vehicle 1 having turn indicators 3 and comprising a positioning system 4 having access to map data 5 and one or more sensors 6 for monitoring the road vehicle 1 surroundings as well as one or more gears for selectively travelling forward or in reverse. The road vehicle 1 turn signal assist system 2 is arranged to use current positioning information and map data for the current position to determine if parking of the road vehicle 1 is in progress when a reverse gear is selected.

If determined by the road vehicle 1 turn signal assist system 2 that parking of the road vehicle 1 is in progress and the one or more sensors 6 for monitoring the road vehicle 1 surroundings are detecting moving objects 7 the road vehicle 1 turn signal assist system 2 will activate the right hand side or left hand side road vehicle turn indicators 3 to indicate the ongoing parking operation. The selection of which side road vehicle turn indicators 3 that will be activated will be described later. Activation will only be performed if activation of the appropriate road vehicle turn indicators 3 has not already been done manually by a driver of the associated road vehicle 1.

The requirement that the one or more sensors 6 for monitoring the road vehicle 1 surroundings should be detecting moving objects 7 serves the purpose of restricting automated activation of the road vehicle turn indicators 3 to situations where the road vehicle 1 turn signal assist system 2 identifies other actors in the traffic environment potentially affected by the parking maneuver, e.g. a pedestrian 7 as illustrated in FIG. 2.

The requirement that a reverse gear should be selected serves the purpose of restricting automated activation of the road vehicle turn indicators 3 to situations where the road vehicle 1 is in the process of being reversed, which has an increased potential of putting other actors in the traffic environment at risk due to the usually more restricted observability when reversing a road vehicle 1, e.g. actors such as a pedestrian 7 as illustrated in FIG. 2.

The requirement that the road vehicle turn indicators 3 should only be activated if activation of the appropriate road vehicle turn indicators 3 has not already been done manually by a driver of the associated road vehicle 1 is self-evident, as activation in such cases already will have been done and thus there is no need for automated activation.

FIG. 2 illustrates schematically a road vehicle 1 according to FIG. 1 in a parking scenario where the road vehicle 1 is about to reverse into an available parking slot 8 in a traffic environment comprising a pedestrian 7, potentially affected by the upcoming parking maneuver. The flash shaped arrow between the road vehicle 1 and the other vehicle 15 parked in front of the available slot 8 illustrates that the road vehicle 1 may obtain information on the available slot from the other vehicle 15 using vehicle-to-vehicle (V2V) communication. The flash shaped arrow between the road vehicle 1 and a roadside communications facility 16, possibly connected to a cloud 13, e.g. via the internet, illustrates that the road vehicle 1 may obtain information on the available slot 8 reported to the cloud by other vehicles travelling in the same road network or otherwise by automated slot availability reporting arrangements or services, e.g. using vehicle-to-infrastructure (V2X) communication. The dotted triple arcs adjacent the right hand side turn indicators 3 illustrates how the right hand side turn indicators 3 have been activated in accordance with embodiments described herein.

In some embodiments the turn signal assist system 2 further, in order to determine if parking of the road vehicle 1 is in progress, is arranged to use the current positioning information and map data 5 for the current position to determine if there exists a parking slot 8 at the current position. Thus, if determined that a parking slot 8 exists, whilst in reverse gear and the one or more sensors 6 for monitoring the road vehicle 1 surroundings are detecting moving objects 7, the turn signal assist system 2 will determine that parking of the road vehicle 1 is in progress and activate the road vehicle 1 turn indicators 3. Hereby is provided an efficient way of determining that parking of the road vehicle 1 is in progress.

According to further embodiments it is envisaged that the road vehicle 1 further comprises an arrangement 9 for vehicle-to-vehicle (V2V) or vehicle-to-infrastructure (V2X) communication arranged to receive dynamic information relating to the availability of a free parking slot 8 at the current position. Thus, if determined that a free parking slot 8 exists, whilst in reverse gear and the one or more sensors 6 for monitoring the road vehicle 1 surroundings are detecting moving objects 7, the turn signal assist system 2 will determine that parking of the road vehicle 1 is in progress and activate the road vehicle 1 turn indicators 3. This provides a further efficient way of determining that parking of the road vehicle 1 is in progress.

In still some embodiments it is envisaged that the road vehicle 1 further comprises a navigation system 10 capable of providing navigational instructions for travelling to a specified destination, and if determined by the turn signal assist system 2 that the current position is within a pre-determined proximity of the specified destination whilst in reverse gear and the one or more sensors 6 for monitoring the road vehicle 1 surroundings are detecting moving objects 7, the turn signal assist system 2 will determine that parking of the road vehicle 1 is in progress and activate the road vehicle 1 turn indicators 3. Thus is provided a still further efficient way of determining that parking of the road vehicle 1 is in progress.

According to a development of the previous embodiment the navigation system 10 is further arranged to predict a travel destination when no destination has been specified. Such prediction may e.g. be made from travelling history of the road vehicle 1, such that if the road vehicle 1 is positioned on a road leading up to a destination often travelled to at that time and weekday then the road vehicle 1 is predicted to travel to that destination.

Thus, if determined that the current position is within a pre-determined proximity of the predicted travel destination whilst in reverse gear and the one or more sensors 6 for monitoring the road vehicle 1 surroundings are detecting moving objects 7, the turn signal assist system 2 will determine that parking of the road vehicle 1 is in progress and activate the road vehicle 1 turn indicators 3. Using a predicted travel destination and determining if the current position is within a pre-determined proximity of the predicted travel destination provides for a yet further efficient way of determining that parking of the road vehicle 1 is in progress.

In order to select which side road vehicle turn signals 3 to activate in embodiments described herein as a first alternative the road vehicle 1 further comprises a driver monitoring camera 11. The driver monitoring camera 11 is arranged to determine a viewing direction of a driver of the road vehicle 1. The determined viewing direction is used for selectively activating right hand side or left hand side road vehicle turn signals 3, e.g. if the attention of a driver of the road vehicle 1 is focused on the right hand side of the road vehicle 1, the right hand side road vehicle turn signals 3 are activated, and conversely, if the attention of a driver of the road vehicle 1 is focused on the left hand side of the road vehicle 1, the left hand side road vehicle turn signals 3 are activated. This provides an efficient way of selecting which side road vehicle turn signals 3 to activate.

In a second alternative for selecting which side road vehicle turn signals 3 to activate is envisaged that the road vehicle 1 further comprises a parking assistance system 12 arranged to scan the road vehicle 1 surroundings to identify available parking slots 8 and provide slot 8 identified information when an appropriate parking slot 8 is identified. Thus, slot 8 identified information from the parking assistance system 12 is used for selectively activating right hand side or left hand side road vehicle turn signals 3, e.g. if a slot 8 is identified on the right hand side of the road vehicle 1, the right hand side road vehicle turn signals 3 are activated, and conversely, if a slot 8 is identified on the left hand side of the road vehicle 1, the left hand side road vehicle turn signals 3 are activated. This provides a further efficient way of selecting which side road vehicle turn signals 3 to activate.

In a third alternative for selecting which side road vehicle turn signals 3 to activate is envisaged that map data 5 comprising information on available parking slots 8 at the current position is used for selectively activating right hand side or left hand side road vehicle turn signals 3, e.g. if map data 5 information indicates a slot 8 on the right hand side of the road vehicle 1, the right hand side road vehicle turn signals 3 are activated, and conversely, if map data 5 information indicates a slot 8 on the left hand side of the road vehicle 1, the left hand side road vehicle turn signals 3 are activated. Hereby is provided a still further efficient way of selecting which side road vehicle turn signals 3 to activate.

According to a fourth alternative for selecting which side road vehicle turn signals 3 to activate is envisaged that the road vehicle 1 further is arranged to access cloud data 13 relating to parking slot 8 availability at the current position using V2V or V2X communication 9 and that the cloud data 13 relating to parking slot 8 availability at the current position is used for selectively activating right hand side or left hand side road vehicle turn signals 3, e.g. if cloud data 13 indicates a slot 8 on the right hand side of the road vehicle 1, the right hand side road vehicle turn signals 3 are activated, and conversely, if cloud data 13 indicates a slot 8 on the left hand side of the road vehicle 1, the left hand side road vehicle turn signals 3 are activated. Cloud data 13, as used herein, is envisaged as comprising map data 5 as well as dynamic data on parking slot 8 availability, such as communicated by other road vehicles 15 using V2X or V2V communication. Thus, using information on available parking slots 8 at the current position obtained from cloud data 13 for selectively activating right hand side or left hand side road vehicle turn signals 3 provides a yet further efficient way of selecting which side road vehicle turn signals 3 to activate.

In further embodiments it is envisaged that the road vehicle further comprises a 360° surround view system 14 arranged to provide a driver of the road vehicle 1 with a bird's-eye view of the road vehicle 1 surroundings, e.g. using camera sensors 6, and that the turn signal assist system 2 further is arranged to determine that parking of the road vehicle 1 is in progress when a reverse gear is selected and the 360° surround view system 14 is active using current positioning information and map data for the current position. This provides a further efficient way of determining that parking of the road vehicle 1 is in progress.

According to a fifth alternative for selecting which side road vehicle turn signals 3 to activate is envisaged that the road vehicle 1 further comprises a steering angle sensor arranged to provide information on a current road vehicle 1 steering angle. The information on the current road vehicle 1 steering angle is used for selectively activating right hand side or left hand side road vehicle turn signals 3, e.g. if the steering angle indicates an intention to travel to a slot 8 on the right hand side of the road vehicle 1, the right hand side road vehicle turn signals 3 are activated, and conversely, if the steering angle indicates an intention to travel to a slot 8 on the left hand side of the road vehicle 1, the left hand side road vehicle turn signals 3 are activated. This provides a yet further efficient way of selecting which side road vehicle turn signals 3 to activate.

It is further envisaged that the described alternatives for selecting which side road vehicle turn signals 3 to activate may be combined or used simultaneously by the road vehicle 1 turn signal assist system 2, for enhancing the ability to determine which side road vehicle turn signals 3 to activate.

It is still further suggested that the described ways of determining that parking of the road vehicle 1 is in progress may be combined or used simultaneously by the road vehicle 1 turn signal assist system 2, for enhancing the ability to determine that parking of the road vehicle 1 is in progress.

Further, in accordance with the present application is also envisaged a an improved road vehicle 1 turn signal assist method for a road vehicle 1 having turn indicators 3 and comprising a positioning system 4 having access to map data 5 and one or more sensors 6 for monitoring the road vehicle 1 surroundings as well as one or more gears for selectively travelling forward or in reverse.

This is provided through a method that comprises using current positioning information and map data for the current position to determine if parking of the road vehicle 1 is in progress when a reverse gear is selected, and if determined that parking of the road vehicle 1 is in progress and the one or more sensors 6 for monitoring the road vehicle 1 surroundings are detecting moving objects 7, if not already manually activated, activating the right hand side or left hand side road vehicle turn indicators 3 to indicate the ongoing parking operation.

Further, in accordance with the present application is also envisaged a road vehicle 1 comprising a road vehicle 1 turn signal assist system 2, as described in the foregoing. A road vehicle that comprises a road vehicle 1 turn signal assist system 2, as above, e.g. provides for reducing cases of lack of activated turn signals during road vehicle 1 parking maneuvers.

It should be noted that the turn signal assist system 2, positioning system 4, map data 5, sensors 6, V2V and/or V2X communication arrangement 9, navigation system 10, driver monitoring camera 11, parking assistance system 12, cloud data 13, surround view system 14, communications facility 16, as well as any other system, device, unit, arrangement, apparatus, facility or the like described herein may comprise and/or be implemented in or by one or more appropriately programmed processors (e.g., one or more microprocessors including central processing units (CPU)) and associated memory and/or storage, which may include operating system software, application software and/or any other suitable program, code or instructions executable by the processor(s) for controlling operation thereof, for providing and/or controlling interaction and/or cooperation between the various features and/or components described herein, and/or for performing the particular algorithms represented by the various functions and/or operations described herein.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An apparatus for a road vehicle including turn indicators, a positioning system having access to map data, one or more sensors for monitoring the road vehicle surroundings, and one or more gears for selectively travelling forward or in reverse, the apparatus comprising:
    a turn signal assist system; and
    an interface configured to provide for communication between the turn signal assist system and the turn indicators, the positioning system, the one or more sensors, and the one or more gears;
    wherein the turn signal assist system is configured to
        receive current positioning information and map data for the current position,
        determine, when a reverse gear is selected, whether parking of the road vehicle is in progress based on the current positioning information and map data for the current position, and
        when a parking operation of the road vehicle is in progress, and the one or more sensors detect a moving object, and a turn indicator has not already been manually activated, activate a turn indicator to indicate the parking operation.

2. The apparatus according to claim 1 wherein, in order to determine whether parking of the road vehicle is in progress, the turn signal assist system is further configured to use the current positioning information and map data for the current position to determine when there exists a parking slot at the current position, and to determine parking of the road vehicle is in progress when a parking slot exists.

3. The apparatus according to claim 1 further comprising an arrangement for vehicle-to-vehicle or vehicle-to-infrastructure communication configured to receive dynamic information relating to the availability of a free parking slot at the current position, and wherein the turn signal assist system is configured to determine that parking of the road vehicle is in progress when a free parking slot exists.

4. The apparatus according to claim 1 further comprising a navigation system capable of providing navigational instructions for travelling to a specified destination, and wherein the turn signal assist system is configured to determine that parking of the road vehicle is in progress when the current position is within a pre-determined proximity of the specified destination.

5. The apparatus according to claim 4 wherein the navigation system further is arranged to predict a travel destination when no destination has been specified, and wherein the turn signal assist system is configured to determine that parking of the road vehicle is in progress when the current position is within a pre-determined proximity of the predicted travel destination.

6. The apparatus according to claim 1 further comprising a driver monitoring camera configured to determine a viewing direction of a driver of the road vehicle, wherein the turn signal assist system is configured to use the determined viewing direction for selectively activating a right hand side or a left hand side road vehicle turn signal.

7. The apparatus according to claim 1 further comprising a parking assistance system configured to scan the road vehicle surroundings to identify available parking slots, wherein the turn signal assist system is configured to use slot identified information from the parking assistance system for selectively activating a right hand side or a left hand side road vehicle turn signal.

8. The apparatus according to claim 1 wherein the map data further comprises information on available parking slots at the current position and is used for selectively activating a right hand side or a left hand side road vehicle turn signal.

9. The apparatus according to claim 3 wherein the road vehicle is configured to access cloud data relating to parking slot availability at the current position using vehicle-to-vehicle or vehicle-to-infrastructure communication and that the cloud data relating to parking slot availability at the current position is used for selectively activating a right hand side or a left hand side road vehicle turn signal.

10. The apparatus according to claim 1 wherein the road vehicle further comprises a 360° surround view system arranged to provide a driver of the road vehicle with a bird's-eye view of the road vehicle surroundings and wherein the turn signal assist system is further configured to determine that parking of the road vehicle is in progress when a reverse gear is selected and the 360° surround view system is active.

11. The apparatus according to claim 1 wherein the road vehicle further comprises a steering angle sensor arranged to provide information on a current road vehicle steering angle and wherein the turn signal assist system is configured to use information on the current road vehicle steering angle for selectively activating a right hand side or a left hand side road vehicle turn signal.

12. A turn signal assist method for a road vehicle having turn indicators and comprising a positioning system having access to map data and one or more sensors for monitoring the road vehicle surroundings as well as one or more gears for selectively travelling forward or in reverse, the method comprising:
receiving current positioning information and map data for the current position;
when a reverse gear is selected, determining whether a parking operation of the road vehicle is in progress using the current positioning information and map data for the current position; and
when not already manually activated, activating a vehicle turn indicator to indicate the parking operation when parking of the road vehicle is in progress and the one or more sensors for monitoring the road vehicle surroundings detects a moving object.

13. A road vehicle comprising,
turn indicators;
a positioning system having access to map data;
one or more sensors for monitoring the road vehicle surroundings;
one or more gears for selectively travelling forward or in reverse;
a turn signal assist system; and
an interface configured to provide for communication between the turn signal assist system and the turn indicators, the positioning system, the one or more sensors, and the one or more gears;
wherein the turn signal assist system is configured to
receive current positioning information and map data for the current position,
determine, when a reverse gear is selected, whether parking of the road vehicle is in progress using the current positioning information and map data for the current position, and
when a parking operation of the road vehicle is in progress, and the one or more sensors detect a moving object, and a turn indicator has not already been manually activated, activate a turn indicator to indicate the parking operation.

14. The method of claim 12 further comprising determining when there exists a parking slot at the current position based on the positioning information and map data for the current position, and determining that parking of the road vehicle is in progress when a parking slot is determined to exist.

15. The method of claim 12 further comprising receiving from an arrangement for vehicle-to-vehicle or vehicle-to-infrastructure communication dynamic information relating to availability of a free parking slot at the current position, and determining that parking of the road vehicle is in progress when a free parking slot is available.

16. The method of claim 12 further comprising receiving a specified destination from a navigation system capable of providing navigational instructions for travelling to the specified destination, and determining that parking of the road vehicle is in progress when the current position is within a pre-determined proximity of the specified destination.

17. The method of claim 12 further comprising receiving a travel destination from a navigation system arranged to predict a travel destination when no destination has been specified, and determining that parking of the road vehicle is in progress when the current position is within a pre-determined proximity of the predicted travel destination.

18. The method of claim 12 further comprising receiving a viewing direction from a driver monitoring camera configured to determine a viewing direction of a driver of the road vehicle, and selectively activating a right hand side or a left hand side road vehicle turn indicator based on the determined viewing direction.

19. The method of claim 12 further comprising receiving identified available parking slot information from a parking assistance system configured to scan the road vehicle surroundings to identify available parking slots, and selectively activating a right hand side or a left hand side road vehicle turn indicator based on the identified available parking slot information.

20. The method of claim 12 further comprising receiving additional map data including information on available parking slots at the current position, and selectively activating a right hand side or a left hand side road vehicle turn indicator based on the information on available parking slots at the current position.

* * * * *